US009053631B2

(12) United States Patent
Skupin

(10) Patent No.: US 9,053,631 B2
(45) Date of Patent: Jun. 9, 2015

(54) METHOD FOR TRANSMITTING ROUTE DATA FOR TRAFFIC TELEMATICS

(75) Inventor: Christian Skupin, Garbsen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/346,450

(22) PCT Filed: Aug. 6, 2012

(86) PCT No.: PCT/EP2012/065348
§ 371 (c)(1),
(2), (4) Date: Jul. 1, 2014

(87) PCT Pub. No.: WO2013/045150
PCT Pub. Date: Apr. 4, 2013

(65) Prior Publication Data

US 2014/0316686 A1 Oct. 23, 2014

(30) Foreign Application Priority Data

Sep. 26, 2011 (DE) ........................ 10 2011 083 375

(51) Int. Cl.
*G06F 19/00* (2011.01)
*G08G 1/123* (2006.01)
*G08G 1/01* (2006.01)

(52) U.S. Cl.
CPC .............. *G08G 1/012* (2013.01); *G08G 1/0112* (2013.01); *G08G 1/0141* (2013.01)

(58) Field of Classification Search
CPC .............. G05D 1/0274; G05D 1/0291; G05D 2201/0216; H04L 25/067; H04L 1/0019; H04L 1/1809; H04N 7/165; G05B 23/0232; G06F 17/2818; G06F 17/30241; H01L 22/20
USPC ........ 701/117, 122, 120, 118, 32.9, 446, 447; 340/995.1–995.28
See application file for complete search history.

(56) References Cited

U.S. PATENT DOCUMENTS 5,063,603 A * 11/1991 Burt .............................. 382/115
2007/0208492 A1 9/2007 Downs et al.

FOREIGN PATENT DOCUMENTS

EP 2 012 289 1/2009
EP 2012289 * 1/2009
WO WO 2009/116105 9/2009

OTHER PUBLICATIONS

International Search Report for PCT/EP2012/065348, dated Sep. 25, 2012.

* cited by examiner

*Primary Examiner* — Muhammad Shafi
(74) *Attorney, Agent, or Firm* — Kenyon & Kenyon LLP

(57) ABSTRACT

A method for providing traffic telematics information about the travel route of a vehicle traveling on a road system having multiple roads interconnected between road junctions includes: determining a probability of the vehicle approaching a road junction and assigning the probability to the respective road junction, and transmitting information regarding the road junctions for which the probability of being driven through is above a specified threshold.

8 Claims, 1 Drawing Sheet

METHOD FOR TRANSMITTING ROUTE DATA FOR TRAFFIC TELEMATICS

BACKGROUND OF THE INVENTION

1. Field of the Invention

The present invention relates to a method for providing traffic telematics information about the route of a vehicle, which is traveling on a road system having multiple roads; the roads being interconnected between road junctions.

2. Description of the Related Art

Traffic telematics is used to pursue the objective of utilizing an available traffic infrastructure particularly efficiently, in order to prevent, for example, traffic jams, as well as instances in which vehicles are driven without any passengers or driven in search of something. In addition, traffic safety may be increased, thereby achieving a reduction in accidents as a result. The environmental impact may also be reduced by using vehicles more efficiently and optimizing travel routes. In this manner, the $CO_2$ discharge in road traffic is particularly reduced.

Traffic telematics presently relates to individual traffic, and information about current or future routes is transmitted from vehicles to central processing units or exchanged by vehicles among themselves. The exchange of information, that is, the practice of provision of information by the vehicle, is based on different standards. In this context, the different standards have different sizes of data sets, and the objective of transmitting, as efficiently as possible, transmission of included information content regarding the probable future microscopic vehicle route, is pursued. The microscopic vehicle route relates to the vicinity of the vehicle, for example, direct roads or surrounding road paths, including possible road junctions, such as intersections or junctions.

A known method for describing the future vehicle route, which is also referred to, in the microscopic traffic range, as the upcoming vehicle trajectory or probable path, relates to the use of a coordinate sequence. The vehicle trajectory may be approximated using this frequency of coordinates (coordinate tuple), since the coordinates trace, with sufficient resolution, the geographic coordinates of the trajectory to be described. With the aid of so-called map matching, other road users may project the coordinate sequence onto their digital map and therefore deduce the transmitted trajectory. This produces the advantage that in principle, using a suitably high sequence length and resolution, the shape of the trajectory may be simulated as accurately as needed, in order to suitably transmit this. In this context, however, there is the disadvantage that in map data of different manufacturers, the coordinates of like road sections are not forced to include geographic coordinates, and the accuracy is normally approximately 30 meters. Thus, map matching to the exact street is generally not ensured. In addition, the risk of erroneous map matching exists, and a high sequence length of point coordinates is required in order to reduce this risk.

However, since some adjacent road sections run in parallel, this approach does not necessarily lead to a destination and is therefore not reliable. In addition, in order to simulate a trajectory for obtaining a reasonably high map matching score, a multitude of point coordinates, typically, approximately 30 to 50 point coordinates, may be required for a respective microscopic trajectory. In this manner, the transmission of several probable trajectories generates a relatively large quantity of data. When using the customary WGS84 coordinates, 100 point coordinates already generate a net of 800 bytes of data. When using C2X communication by means of IEEE 802.11p for transmitting the data, such a packet size may already be considered critical. The possible trajectories have a high probability of including significant redundancies.

The standard SAE J2735—Dedicated Short Range Communications (DSRC) Message Set Dictionary, is known as a further transmission standard, and this standard is specified for directly predicting a vehicle trajectory via the DF_PathPrediction element with a data field. It is made up of a specification regarding the current steering angle. Consequently, this produces the advantage that this standard may be made available, in essence, for predicting the future track, but this prediction is also not sufficient for determining the microscopic travel route.

The AGORA-C-Standard (ISO 17572-3) is known as a further standard and defines a methodology, which allows relatively reliable position referencing independently of the specific, underlying digital map. In addition to the WGS84 coordinates, attributes specific to the traffic network, such as road class and direction of the corresponding road section, are used. Individual points of the road network, as well as road sections or entire regions of a road network, may be referenced. An AGORA-C referencing of an individual point typically has a data size of less than 50 bytes, while the referencing of road sections consisting of a few kilometers may take up considerably more than 100 bytes. This achieves the advantage that relatively reliable referencing of predicted microscopic routes is provided; however, this is also associated with the disadvantage that the critical data size may be reached rapidly when several possible microscopic routes are transmitted, and the selection is limited to a few possible trajectories.

BRIEF SUMMARY OF THE INVENTION

Thus, the object of the present invention is to provide a method for making available traffic telematics information about the upcoming vehicle trajectory, having as high an accuracy value as possible; and in particular, the object of the present invention is to keep the data transmission rate for transmitting the vehicle trajectory as low as possible.

The present invention incorporates the technical teaching, that the method includes at least the steps of determining a probability of the vehicle approaching a road junction and assigning the probability to the respective road junction, and transmitting the road junctions, for which the probability of being driven through is increased. In this context, a likelihood of a probability greater than a predefined or selectable minimum value being generated is increased.

This junction-probability approach follows the root idea of not transmitting the complete trajectories, but only the relevant road junctions; each of these possible junctions being assigned a probability for its use. Thus, the possible microscopic traffic routes between the points of intersection may be represented in the form of a tree structure. The vehicle may include a traffic telematics unit, and the data regarding the possible road junctions are transmitted either to another road user or to a central processing unit, which has a transmitting unit by which data may be received and sent.

Preferably, the probability of the vehicle driving through specific junctions may be determined by multiplying respective branch probabilities of consecutive junctions. If, for example, the vehicle travels towards a junction, and a first direction of the junction allows it to continue in a plurality of other directions, then there is a higher probability that the vehicle will drive through the junction than the second junction, which provides, for example, a lower number of other possible travel routes. Consequently, road junctions may be assigned to different probabilities, and, for example, only the road junctions, which have a minimum probability of being driven through, are transmitted.

It is further advantageous that a map matching method of the travel route having an increased probability may be implemented with an electronic map, so that the possible travel route of the vehicle having the corresponding probability is received by further road users. With the aid of the map matching of the transmitted points of intersection, other road users may deduce the possible route of the vehicle. The probability of using the respective route may be ascertained by multiplying the corresponding branch probabilities along this route. For a reliable map matching method, the referencing of the points of intersection is rendered possible with the aid of a method independent of a map base, such as the AGORA-C method.

It is particularly advantageous that the data, which are transmitted by the vehicle, may be limited to geographic reference data of the position of the vehicle, to geographic reference data of the forthcoming road junctions and/or a combination of a subsequent road junction with a previous road junction and/or an identification of possible branches of a road junction.

Consequently, the possible branches of a road junction may be assigned probabilities that a respective road junction is exited. In particular, the data transmitted by the vehicle may include the probabilities that the vehicle leaves a road junction. In particular, this may occur with the assignment of usage probabilities of the possible branches of a road junction. Thus, the purpose of these probabilities being able to be used by the receiver is satisfied, in order to determine, apart from the most likely route, the second or third most likely route, but also further probable routes. Unequivocal identification of the possible branches of a road junction may be accomplished, for example, using link angles known from the NDS (navigation data standard) map format. The attributes may be transmitted in the form of a neighborhood list, the so-called adjacency list, and allow the complete reconstruction of the tree structure.

The attainable advantages include a maximum flexibility in the evaluation of probable trajectories, and the method is based on a relatively compact data set, where redundancies, that is, repeating information items, are scarcely present. The points of intersection tend to be able to be matched more reliably in a map than arbitrary points on a route segment. The robustness of the method may be increased further by utilizing the slight redundancy still present, for example, in the information about the position of the vehicle, including a heading, that is, a direction of travel or orientation with regard to the points of a compass, and, therefore, with the addition of the possible derivation of the forthcoming intersections from the map.

It is also advantageous that possible, forthcoming road junctions, which have a probability of being driven through of at least 20%, preferably at least 25%, and particularly preferably at least 30%, may be transmitted. A higher probability limit further reduces the data volume, but the possible accuracy of predicting the route to be traveled and the variety of information for predicting possible routes to be traveled, decrease.

The present invention further relates to a traffic telematics unit for providing traffic telematics information about the route of a vehicle, which is traveling on a road system having multiple roads; the roads being interconnected between road junctions; the traffic telematics being designed for determining a probability of the vehicle approaching a road junction and assigning the probability to the respective road junction, and for transmitting the road junctions for which the probability of being driven through is increased. The additional implementation features and advantages of the method may be correspondingly implemented and used by the traffic telematics unit of the present invention.

The present invention further relates to a computer program having program code means for performing all of the steps of a method having the above-described features and advantages, in particular, when the computer program is executed on a computer or a corresponding traffic telematics unit. Furthermore, the present invention relates to a computer program product having program code means, which are stored on a computer-readable storage medium, in order to perform the steps of the above-described method when the computer program is executed on a computer or a corresponding traffic telematics unit. In this context, the storage medium may also be connected to a file server, which is accessible via the Internet, so that the computer program may be loaded onto a connected computer via the Internet, in order to be executed on it.

BRIEF DESCRIPTION OF THE DRAWINGS

FIG. 2 shows an example of a road system, including travel routes having variously high probabilities of being traveled on.

DETAILED DESCRIPTION OF THE INVENTION

Figure 1:
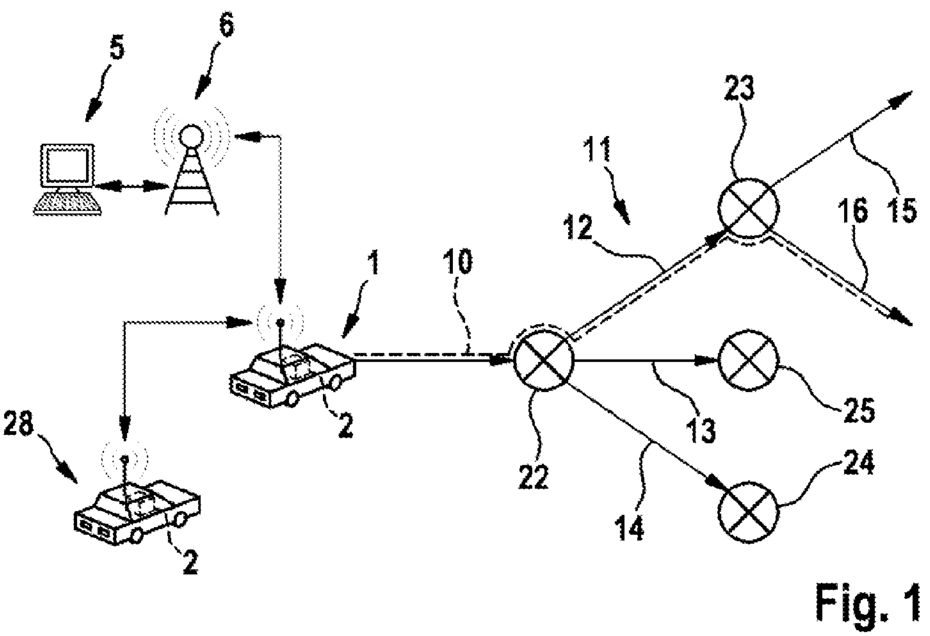
FIG. 1 shows a schematic representation of a road system, including a vehicle, a further road user, and a central processing unit for carrying out a method for providing traffic telematics information.

FIG. 1 shows, in a schematic manner, the view of a road system 11, which may be traveled on by a vehicle 1. Vehicle 1 drives towards a road junction 22, and road junction 22 allows it to continue into roads 12, 13 and 14. Road 12 leads up to road junction 23 and allows continued travel onto roads 15 and 16. Road 13 leads up to road junction 25, and road 14 leads up to road junction 24. For example, a travel route 10 is specified to have a high probability of being traveled on; therefore, the likelihood that vehicle 1 travels on road 12 after road junction 22 is greater than traveling on roads 13 or 14.

In order to provide traffic telematics information, vehicle 1 has a traffic telematics unit 2, by which vehicle 1 may communicate with a traffic telematics unit 2 of a further road user 28 or with a central processing unit 5 via a transmitting unit 6. In this context, the present invention pursues the object of keeping the necessary data volume for communication as low as possible. To this end, the present invention provides that the data, which are sent out to provide traffic telematics information, only allow for the determination of a probability of vehicle 1 approaching a road junction 22, 23, 24 and/or 25 and the assignment of the probability to respective road junction 22, 23, 24 and/or 25; transmission of possible road junctions 22 or 23, for which the probability of being driven through is increased, being subsequently carried out; the road junctions optionally being assigned the corresponding probabilities for use of the respective branching options, in particular, for leaving the respective road junction.

Consequently, the data to be transmitted to traffic telematics unit 2 of further road user 28 and/or to central processing unit 5 may be limited to a smaller data set, which only includes the present geographic reference of vehicle 1, including a heading, and further, the geographic referencing of forthcoming road junctions 22 or 23; a combination of road junctions 22 or 23 linking to the given, previous intersection. In this context, the unequivocal identification of the possible branch for the assignment of usage probabilities of the branches of a point of intersection may be accomplished with the aid of the link angles from the NDS map format. This identification has its meaning in the assignment of probabilities that indicate which probability of a road junction being exited via what branch. In order to further illustrate the determination of the probability of the roads to be traveled on, reference is made to the following FIG. 2.

Figure 2:
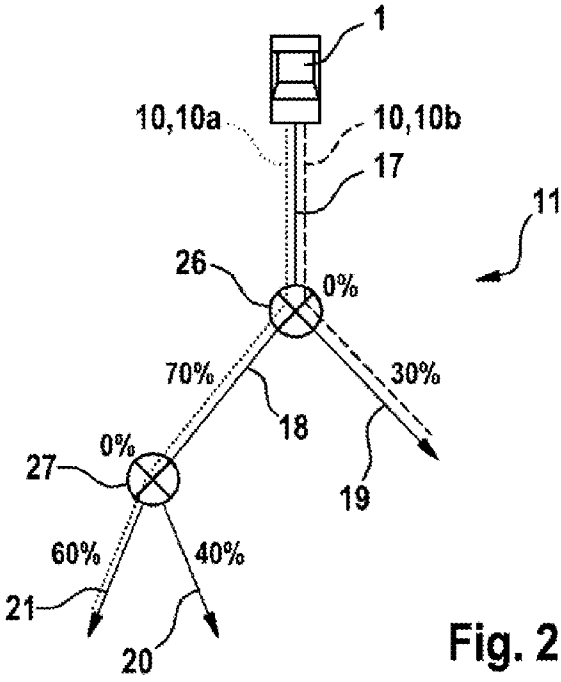

FIG. 2 shows an example of a road system, and a vehicle 1 may travel, for example, via road 17 and arrive at road junction 26. Roads 18 or 19 may be driven onto via road junction 26, illustrated as a fork. If road 18 is driven on, the vehicle may reach road junction 27, from which vehicle 1 retains the option of driving further onto roads 20 and 21. By driving onto road 19, a further possibility of a travel route leading to the destination is unlikely. Consequently, the routes along road 18 and road 19 may be determined to have probabilities of a different magnitude. When road 18 is driven on, the branching-off options leading one further on allows it to receive, for example, a probability of being traveled on by the vehicle of 70%; road 19 only receiving a probability of 30%. In this context, the probability of traveling on these roads corresponds to the branching probabilities of the road junction, from which these roads branch off. If the vehicle passes road junction 26, then, in this example, the branching probability of road junction 26 has a value of 70% for continued travel on road 18, 30% for continued travel on road 19, and 0% for continued travel on road 17. If the vehicle drives along road 18, up to road junction 27, then, in turn, the probability of roads 20 or 21 being driven on may be determined. Since the probability of one continuing on road 21 (not shown in further detail) is greater than road 20, road 21 may be categorized as having a 60% probability of being driven on, and road 20 may be categorized as having, for example, a 40% probability of being driven on.

This categorization allows a tree structure of map 11 to be reconstructed, and only the road junctions 22 to 27 having a suitably high probability of being traveled through are transmitted. For example, a limit of the probability of being traveled on may be set to 30%, and only roads having over a 30% probability of being driven on are transmitted by traffic telematics unit 2.

The present invention is not limited in its implementation to the preferred exemplary embodiment stated above. On the contrary, a number of variants are conceivable, which also make use of the represented means for achieving the object in the case of embodiments of a fundamentally different nature. All of the features derived from the claims, the description or the drawing, and/or advantages, including structural details, spatial arrangements and method steps, may be essential to the present invention, both by themselves and in many different combinations.

What is claimed is:

1. A method for automatically providing traffic telematics information about a travel route of a host vehicle which is traveling on a road system having multiple roads interconnected at multiple road junctions, the method comprising:

determining, by one of (i) a central control unit external to the host vehicle or (ii) a traffic telematics unit of the host vehicle, a respective probability of the host vehicle approaching each respective road junction of the multiple road junctions and assigning the determined respective probabilities to the respective road junctions; and transmitting, to one of the central control unit or another vehicle, information identifying the road junctions for which the probability of the host vehicle traveling through is above a predetermined threshold;

wherein the probability of a selected junction being traveled through by the host vehicle is determined based on the number of road branches extending from the selected junction, and wherein a road junction having a higher number of road branches is determined to have a higher probability of being traveled through than a road junction having a fewer number of road branches.

2. The method as recited in claim 1, wherein a map-matching of a travel route determined to have a probability above a predetermined threshold of being traveled through by the host vehicle is implemented with an electronic map, so that information identifying the map-matched travel route of the host vehicle having the corresponding probability is received by the another road user.

3. The method as recited in claim 2, wherein the information transmitted by the host vehicle includes a geographic reference of the position of the host vehicle and at least one of (i) a geographic reference of a forthcoming road junction, (ii) a combination of the forthcoming road junction and a previous road junction, and (iii) an identification of possible branches of the forthcoming road junction.

4. The method as recited in claim 3, wherein information regarding forthcoming road junctions which have a minimum probability of at least 30% of being traveled through by the host vehicle is transmitted.

5. The method as recited in claim 2, wherein the information transmitted by the host vehicle includes the probability of the host vehicle leaving a particular road junction.

6. A traffic telematics unit for providing traffic telematics information about a travel route of a host vehicle which is traveling on a road system having multiple roads interconnected at multiple road junctions, comprising:

means for determining a respective probability of the host vehicle approaching each respective road junction of the multiple road junctions and assigning the determined respective probabilities to the respective road junctions; and means for transmitting, to one of a central control unit or another vehicle, information identifying the road junctions for which the probability of the host vehicle traveling through is above a predetermined threshold;

wherein the probability of a selected junction being traveled through by the host vehicle is determined based on the number of road branches extending from the selected junction, and wherein a road junction having a higher number of road branches is determined to have a higher probability of being traveled through than a road junction having a fewer number of road branches.

7. The traffic telematics unit as recited in claim 6, wherein a map-matching of a travel route determined to have a probability above a predetermined threshold of being traveled through by the host vehicle is implemented with an electronic map, so that information identifying the map-matched travel route of the host vehicle having the corresponding probability is received by the another road user.

8. A non-transitory, computer-readable data storage medium storing a computer program having program codes which, when executed on a computer, performs method for automatically providing traffic telematics information about a travel route of a host vehicle which is traveling on a road system having multiple roads interconnected at multiple road junctions, the method comprising:

determining, by one of (i) a central control unit external to the host vehicle or (ii) a traffic telematics unit of the host vehicle, a respective probability of the host vehicle approaching each respective road junction of the multiple road junctions and assigning the determined respective probabilities to the respective road junctions; and transmitting, to one of the central control unit or another vehicle, information identifying the road junctions for which the probability of the host vehicle traveling through is above a predetermined threshold;

wherein the probability of a selected junction being traveled through by the host vehicle is determined based on the number of road branches extending from the selected junction, and wherein a road junction having a higher number of road branches is determined to have a higher probability of being traveled through than a road junction having a fewer number of road branches.

* * * * *